May 24, 1927.
E. V. RIPPINGILLE
1,630,029
LIQUID LEVEL INDICATOR
Original Filed Nov. 8, 1923   2 Sheets-Sheet 1
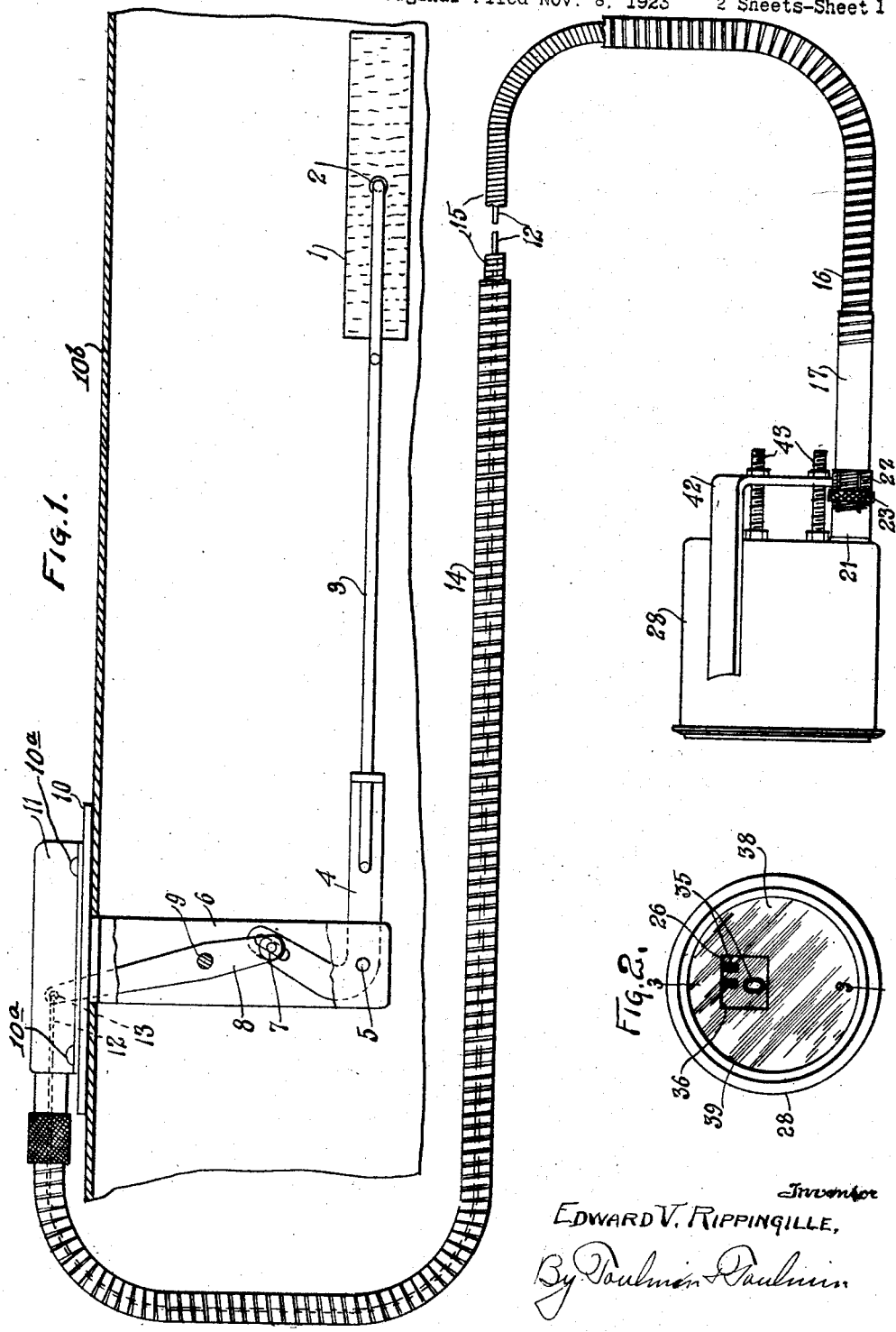
Edward V. Rippingille,
By Toulmin & Toulmin
Attorneys May 24, 1927.
E. V. RIPPINGILLE
1,630,029
LIQUID LEVEL INDICATOR
Original Filed Nov. 8, 1923   2 Sheets-Sheet 2
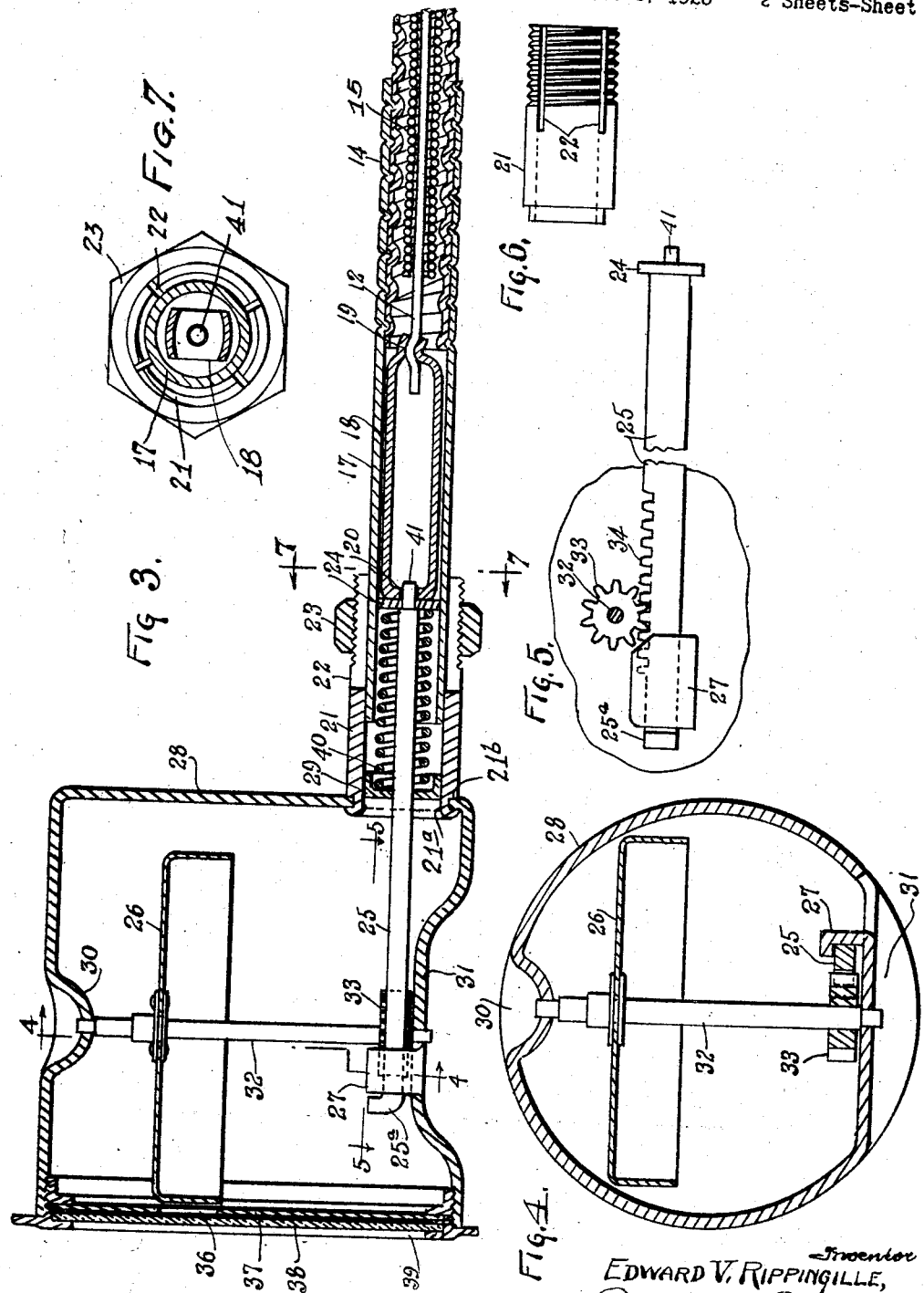
Inventor
EDWARD V. RIPPINGILLE,
By Toulmin & Toulmin,
ATTORNEYS Patented May 24, 1927.

1,630,029

UNITED STATES PATENT OFFICE.

EDWARD V. RIPPINGILLE, OF DETROIT, MICHIGAN, ASSIGNOR TO THE GROLAN MANUFACTURING COMPANY, OF DAYTON, OHIO, A CORPORATION OF DELAWARE.

LIQUID-LEVEL INDICATOR.

Original application filed November 8, 1923, Serial No. 673,403. Divided and this application filed June 16, 1924. Serial No. 720,178.

My invention relates to gauges, and in particular to gauges for measuring the heights of liquids in tanks remotely located from the point of indication, and is a division of my application filed Nov. 8, 1923, Ser. No. 673,403.

The object of my invention is to provide a quick and certain means of accurately connecting the indicator head and actuating means to one another without the possibility of the communicating means being damaged.

It is a further object to provide such means of attachment that any unskilled or relatively skilled laborer may make the attachment without the possibility of injury to the delicate communicating means or access to it for purposely tampering therewith.

It is my object to provide a simple adjustment of this character which will also permit of the person installing the equipment to ascertain whether or not the float is on the bottom of the tank, and therefore in zero position, before the indicator is connected which also at the time of connection indicates zero, so that the indicator when connected will accurately indicate the height of the liquid in the tank or the fact that there is no liquid in the tank. As a matter of precaution, it is necessary to ascertain if the wire constituting the communicating means is moving freely and that the float is on the bottom of the tank in zero position. My present invention accomplishes this object and also the object of preventing any injury at any time to the delicate communicating means.

My invention also provides means of ready assembly of the indicator head and also permits of the use of subassemblies which may be economically made by unskilled labor in the factory in order to effect the necessary economies in the production of such apparatus.

It has been found in installing gauges of this character that if the flexible communicating means, such as a fine wire, is allowed to project from its housing when disconnected from the indicator head it becomes bent or twisted and the ordinary laborer installing the equipment on the automobile will not take the trouble or has not the skill to straighten the wire and attach it to the indicator head. To solve this condition, I have developed the present invention in order that on the assembly line of automobile where the laborer must make a quick but accurate application all that is necessary by my invention is to slide the guide tube into the split collar of the indicator head until the actuating link comes in contact with the end of the indicator rack with the float in the tank on the bottom of the tank and the indicator dial registering zero. By a turn of the clamping nut the parts are clamped together and the task is quickly and accurately completed. There is no danger of the wire being tampered with or injured because even in the uppermost position of the float nothing projects outside of the guide tube.

Referring to the drawings:

Fig. 1 is an elevation of the complete equipment with a portion of the housing broken away to show the wire with the float in its lowered position.

Fig. 2 is a front elevation of the face of the indicator head.

Fig. 3 is a section on the line 3—3 of Fig. 2 through the indicator head and the attaching devices of the actuating means with the indicator showing the shaft as having been operated against the tension of the spring means.

Fig. 4 is a section on the line 4—4 of Figure 3.

Fig. 5 is a section on the line 5—5 of Fig. 3 illustrating in detail the rack and pinion construction of the indicator head.

Fig. 6 is an enlarged view of the split clamping collar carried by the indicator head.

Figure 7 is a section taken on the line 7—7 of Figure 3 and looking in the direction indicated.

Referring to the drawings in detail:

1 is a float of cork or similar material pivoted at 2 upon a float arm 3, which is mounted on one end of a bell crank 4. This bell crank is pivoted at 5 to a suspending bracket 6. The other end of the bell crank slidingly engages at 7 with a lever 8, which is also pivoted on the bracket 6, as at 9. This bracket 6 is suspended from a tank plate 10, as shown at 10ª. The upper end of the lever 8 projects into a housing mounted on the tank plate, which housing is designated 11. The end of the wire 12 is connected to the upper end of this lever 8, as at 13. To the housing is connected the outside flexible casing or housing 14 and the inside flexible casing 15. These casings are to both guide and protect the wire 12. This wire is very flexible, but very strong, and fits relatively closely within the inside casing 15.

The indicator end of this outside casing 14 is crimped as at 16 and extends into a guide tube 17 which projects beyond the end of the outside casing 14, a distance sufficient for the following purpose. A guiding link 18 is inserted in the tube 17 at the end of the casing 14, and is connected at one end to the wire 12, as shown at 19. The total movement of the wire and the link to indicate whether the tank is empty or full will not be sufficient to project the end of the link beyond the guide tube 17 so that it is never possible for the link or the wire to become twisted, mashed, or damaged, as both elements are always protected by either the guide tube 17 or the flexible casings.

In Fig. 3 the parts are shown in full tank position. Before attachment to the indicator head the operator may, if he so desires, insert a wire hook into the opening 20 of the actuating link, and by moving the link and wire can tell by the wire and the sound whether the float is resting on the bottom of the tank when the piston is in its fully retreated position, as in Fig. 3. Having ascertained this condition, the next step is for the operator to insert the guide tube 17 into a split tube or collar 21, at the end of the guide tube. This collar 21 is mounted in one wall 28 of the indicator housing which is cut away, as shown at 21ª. The collar 21 has a groove 21ᵇ adapted to receive the casing wall 28. A number of slots 22 are cut in the end of this split tube to permit it to be collared on the guide tube and clamped thereon. A collar threaded on the guide tube, such as 23, serves the purpose of clamping the split tube upon the guide tube. The extent to which the guide tube is necessarily inserted in the split tube is determined by the actuating piston head coming in contact with the head 24 of the actuating rack 25, when the dial 26 of the indicator head is registering zero and when the float is on the floor of the tank. At such a time the indicator will register zero and the left hand end of the actuating link will be in engagement with the actuating head 24. The parts can then be clamped together.

The actuating rack 25 which is provided with a head 25ª is guided at one end by the head 24 and the other end by a guiding lip 27 which is struck up in an indicator housing 28. The medial position of the rack 25 passes through and is guided by a collar 29 inserted in the split tube 21. The housing 28 is provided with depressed portions 30 and 31 in which the ends of a shaft 32 are journaled upon which is mounted a pinion 33 engaging with rack teeth 34 and rotated thereby.

This results in rotating the shaft 32 and with it the drum 26 of the indicator which is fixed thereon. Numerals appear on the face of the drum as at 35, which are visible to the observer through the opening 36 in a plate 37 beneath the glass 38, which is carried by a ring 39, which is threaded in the indicator housing 28.

In order to maintain this indicator mechanism at zero position a helical spring 40 is mounted upon the rack 25 with one end engaging the head 24 and the other end the collar 29 so that this spring constantly tends to resist the return of the wire and actuating link to zero position as it is moved thereby by the float and also tends to resist the movement of the indicator to zero position. These parts are suitably aligned by the end 41 of the rack projecting into the opening 20 of the head of the actuating piston.

The indicator head itself is attached to the dash board of an automobile, for instance, by the usual U-clamp 42 carried on bolts 43.

It will be understood that I desire to comprehend within my invention such modifications as may be fairly embraced within it, and as may be found necessary in adapting it to various conditions in the art in the course of the application of the invention.

Having thus fully described my invention, what I claim as new and desire to secure by Letters Patent, is:—

In a gauge equipment, an indicator consisting of an open-ended housing, a shaft journalled therein, an indicator drum on said shaft, means for closing the open end of the housing and constructed to expose a portion of said drum to render readings on the drum visible, a rack, means struck up from said housing wall to guide and support said rack, a split tube carried by said housing into which one end of said rack projects, spring means put under tension when said rack is moved in one direction, whereby the rack may return to its initial position when the tension of the spring means is released, and means on said shaft for operatively engaging with said rack.

In testimony whereof, I affix my signature.

EDWARD V. RIPPINGILLE.